US007576154B2

(12) United States Patent
Yamada et al.

(10) Patent No.: US 7,576,154 B2
(45) Date of Patent: Aug. 18, 2009

(54) BIODEGRADABLE MATERIAL FOR AUDIO SYSTEMS

(75) Inventors: Shinichiro Yamada, Kanagawa (JP); Yuko Fujihira, Kanagawa (JP); Hiroyuki Mori, Kanagawa (JP); Tsutomu Noguchi, Kangawa (JP); Kunihiko Tokura, Tokyo (JP); Masaru Uryu, Chiba (JP)

(73) Assignee: Sony Corporation, Tokyo (JP)

( * ) Notice: Subject to any disclaimer, the term of this patent is extended or adjusted under 35 U.S.C. 154(b) by 357 days.

(21) Appl. No.: 10/537,168

(22) PCT Filed: Nov. 28, 2003

(86) PCT No.: PCT/JP03/15234

§ 371 (c)(1), (2), (4) Date: Nov. 21, 2005

(87) PCT Pub. No.: WO2004/052047

PCT Pub. Date: Jun. 17, 2004

(65) Prior Publication Data

US 2006/0124383 A1 Jun. 15, 2006

(30) Foreign Application Priority Data

Dec. 2, 2002 (JP) ............................. 2002-350369

(51) Int. Cl.
*C08K 3/10* (2006.01)
*C08K 3/30* (2006.01)
*C08K 3/26* (2006.01)

(52) U.S. Cl. ....................... 524/413; 524/418; 524/425; 524/436; 524/437; 524/449; 524/451

(58) Field of Classification Search ................. 524/418, 524/425, 413, 436, 437, 449, 451
See application file for complete search history.

(56) References Cited

U.S. PATENT DOCUMENTS

2002/0128344 A1 * 9/2002 Fujihira et al. .............. 522/162

FOREIGN PATENT DOCUMENTS

EP 1213111 A2 * 6/2002
JP 2002-88161 3/2002

* cited by examiner

*Primary Examiner*—Kriellion A Sanders
(74) *Attorney, Agent, or Firm*—Sonnenschein Nath & Rosenthal LLP

(57) ABSTRACT

A material for acoustic apparatus housing, which is advantageous not only in that it prevents the resin from suffering corrosion and is unlikely to impose a burden on the environment, but also in that it has excellent performance as an acoustic apparatus housing. A material for acoustic apparatus housing, characterized in that it comprises a biodegradable polymer compound, an inorganic material, and a hydrolysis inhibitor.

11 Claims, 6 Drawing Sheets

| ORDER | No. | F1 | F0 | F2 | Q | 1/Q | E (Pa) | SPEED(m/s) |
|---|---|---|---|---|---|---|---|---|
| 1 | 1 | 46.353 | 46.814 | 47.314 | 48.724 | 0.02052 | 5.52E+09 | 1838.583 |
| 2 | 2 | 283.062 | 289.238 | 296.04 | 22.288 | 0.04487 | 5.37E+09 | 1812.63 |
| 3 | 3 | 820.852 | 833.453 | 846.861 | 32.044 | 0.03121 | 5.68E+09 | 1865.391 |
| 4 | 4 | 1560.683 | 1611.788 | 1667.703 | 15.061 | 0.0664 | 5.54E+09 | 1841.096 |
| 5 | 5 | 2633.009 | 2698.493 | 2781.298 | 18.198 | 0.05495 | 5.68E+09 | 1864.515 |
| 6 | 6 | 4080.818 | 4141.916 | 4235.872 | 26.713 | 0.03744 | 5.99E+09 | 1915.681 |

| ORDER | No. | F1 | F0 | F2 | Q | 1/Q | E (Pa) | SPEED(m/s) |
|---|---|---|---|---|---|---|---|---|
| 1 | 1 | 51.977 | 52.298 | 52.581 | 86.628 | 0.01154 | 7.92E+09 | 2206.923 |
| 2 | 2 | 324.432 | 326.769 | 329.243 | 67.919 | 0.01472 | 7.88E+09 | 2200.337 |
| 3 | 3 | 913.331 | 921.018 | 929.489 | 57 | 0.01754 | 7.98E+09 | 2214.88 |
| 4 | 4 | 1795.132 | 1812.903 | 1831.932 | 49.265 | 0.0203 | 8.05E+09 | 2225.035 |
| 5 | 5 | 2975.359 | 3007.378 | 3039.397 | 46.962 | 0.02129 | 8.11E+09 | 2232.678 |
| 6 | 6 | 4472.125 | 4513.442 | 4561.018 | 50.774 | 0.0197 | 8.18E+09 | 2242.969 |
| 7 | 7 | 6263.285 | 6320.966 | 6380.137 | 54.094 | 0.01849 | 8.23E+09 | 2249.182 |
| 8 | 8 | 8330.064 | 8403.134 | 8492.486 | 51.736 | 0.01933 | 8.20E+09 | 2245.792 |

| ORDER | No. | F1 | F0 | F2 | Q | 1/Q | E (Pa) | SPEED(m/s) |
|---|---|---|---|---|---|---|---|---|
| 1 | 1 | 46.185 | 46.487 | 46.672 | 95.613 | 0.01046 | 5.80E+09 | 1987.766 |
| 2 | 2 | 284.594 | 286.533 | 288.504 | 73.273 | 0.01365 | 5.62E+09 | 1955.023 |
| 3 | 3 | 801.218 | 807.923 | 814.758 | 59.672 | 0.01676 | 5.69E+09 | 1968.71 |
| 4 | 4 | 1565.32 | 1582.175 | 1600.303 | 45.226 | 0.02211 | 5.69E+09 | 1967.641 |
| 5 | 5 | 2599.562 | 2629.307 | 2661.109 | 42.72 | 0.02341 | 5.75E+09 | 1977.919 |
| 6 | 6 | 3909.045 | 3954.831 | 3996.01 | 45.476 | 0.02199 | 5.83E+09 | 1991.465 |
| 7 | 7 | 5487.48 | 5545.251 | 5603.778 | 47.681 | 0.02097 | 5.87E+09 | 1999.363 |
| 8 | 8 | 7287.295 | 7384.503 | 7465.186 | 41.512 | 0.02409 | 5.88E+09 | 1999.764 |
| 9 | 9 | 9301.764 | 9422.684 | 9534.105 | 40.555 | 0.02466 | 5.80E+09 | 1986.569 |

| ORDER | No. | F1 | F0 | F2 | Q | 1/Q | E (Pa) | SPEED(m/s) |
|---|---|---|---|---|---|---|---|---|
| 1 | 1 | 49.257 | 49.709 | 50.139 | 56.34 | 0.01775 | 7.72E+09 | 2095.049 |
| 2 | 2 | 307.778 | 311.144 | 314.569 | 45.818 | 0.02183 | 7.70E+09 | 2092.506 |
| 3 | 3 | 865.675 | 876.761 | 888.739 | 38.014 | 0.02631 | 7.80E+09 | 2105.818 |
| 4 | 4 | 1703.941 | 1729.29 | 1756.769 | 32.735 | 0.03055 | 7.90E+09 | 2119.762 |
| 5 | 5 | 2827.55 | 2876.214 | 2921.549 | 30.598 | 0.03268 | 8.00E+09 | 2132.635 |
| 6 | 6 | 4238.467 | 4315.866 | 4383.898 | 29.676 | 0.0337 | 8.07E+09 | 2142.104 |
| 7 | 7 | 5936.024 | 6036.723 | 6145.308 | 28.845 | 0.03467 | 8.09E+09 | 2145.357 |
| 8 | 8 | 7890.734 | 8034.545 | 8184.779 | 27.324 | 0.0366 | 8.09E+09 | 2144.602 |

| ORDER | No. | F1 | F0 | F2 | Q | 1/Q | E (Pa) | SPEED(m/s) |
|---|---|---|---|---|---|---|---|---|
| 1 | 1 | 30.302 | 35.2 | 35.481 | 6.796 | 0.14714 | 2.67E+09 | 1379.187 |
| 2 | 2 | 214.172 | 217.618 | 221.09 | 31.455 | 0.03179 | 2.59E+09 | 1360.565 |
| 3 | 3 | 601.782 | 613.349 | 626.028 | 25.297 | 0.03953 | 2.63E+09 | 1369.516 |
| 4 | 4 | 1185.271 | 1209.45 | 1239.231 | 22.414 | 0.04462 | 2.66E+09 | 1378.246 |
| 5 | 5 | 1972.824 | 2016.391 | 2065.368 | 21.788 | 0.0459 | 2.71E+09 | 1389.919 |
| 6 | 6 | 2969.055 | 3032.41 | 3101.626 | 22.874 | 0.04372 | 2.74E+09 | 1399.2 |
| 7 | 7 | 4166.282 | 4246.729 | 4370.818 | 20.763 | 0.04816 | 2.76E+09 | 1403.047 |
| 8 | 8 | 5549.584 | 5663.974 | 5805.231 | 22.155 | 0.04514 | 2.77E+09 | 1405.485 |
| 9 | 9 | 7089.172 | 7261.75 | 7445.158 | 20.399 | 0.04902 | 2.76E+09 | 1402.871 |
| 10 | 10 | 8736.672 | 8969.081 | 9187.667 | 19.887 | 0.05028 | 2.70E+09 | 1387.184 |

| ORDER | No. | F1 | F0 | F2 | Q | 1/Q | E (Pa) | SPEED(m/s) |
|---|---|---|---|---|---|---|---|---|
| 1 | 1 | 63.619 | 64.111 | 64.587 | 66.291 | 0.01508 | 3.52E+09 | 1660.073 |
| 2 | 2 | 399.617 | 403.18 | 406.692 | 56.984 | 0.01755 | 3.54E+09 | 1665.869 |
| 3 | 3 | 1117.846 | 1130.111 | 1142.74 | 45.396 | 0.02203 | 3.55E+09 | 1667.62 |
| 4 | 4 | 2187.362 | 2215.65 | 2244.268 | 38.935 | 0.02568 | 3.55E+09 | 1668.618 |
| 5 | 5 | 3609.279 | 3657.979 | 3707.337 | 37.304 | 0.02681 | 3.54E+09 | 1666.376 |
| 6 | 6 | 5371.468 | 5443.204 | 5516.999 | 37.402 | 0.02674 | 3.52E+09 | 1659.83 |
| 7 | 7 | 7449.272 | 7553.727 | 7655.571 | 36.615 | 0.02731 | 3.47E+09 | 1649.286 |

BIODEGRADABLE MATERIAL FOR AUDIO SYSTEMS

TECHNICAL FIELD

The present invention relates to an acoustic apparatus housing material used in an acoustic apparatus and an acoustic apparatus housing using the same. More particularly, the present invention relates to a material for acoustic apparatus housing, which can improve the tone quality and protect the environment simultaneously, and an acoustic apparatus housing using the same.

BACKGROUND ART

Conventionally, acoustic apparatuses having improved tone quality have been developed. In the acoustic apparatuses, particularly, the improvement of acoustic properties, such as an output acoustic pressure level, distortion ratio, and flatness, is desired. In recent years, it is believed that the acoustic properties depend on various physical properties of a housing of the acoustic apparatus, and hence the physical properties of the acoustic apparatus housing are considered to be important. When an acoustic apparatus is driven to generate acoustic waves, the acoustic apparatus housing generally vibrates in resonance with the acoustic waves. Consequently, the resonance causes the tone quality of the acoustic apparatus to be poor. For solving this problem, it is considered that a rigid material having an appropriately large internal loss is used in the acoustic apparatus to improve the acoustic properties including an output acoustic pressure level, distortion ratio, and flatness. Therefore, a wood board, such as lauan made of wood as a raw material, or a particle board formed from wood pieces bonded by an adhesive, has been used as a material for the acoustic apparatus housing.

However, when the wood board is used as a material for acoustic apparatus housing, the wood board has a small degree of freedom in the outer shape and hence restricts its use, and thus the wood board does not meet the demands. Further, the wood board needs a step for assembling wood boards processed into desired forms, and hence lowers the productivity, and thus the wood board does not satisfy the requirement in respect of productivity. For solving these problems, as a material for acoustic apparatus housing, a material obtained by mixing a thermoplastic or thermosetting resin with inorganic filler and subjecting the resultant mixture to injection molding is studied and used (Japanese Patent Application Publication No. JP H06-169498). The resultant acoustic apparatus housing is improved in rigidity due to the inorganic filler; however, the acoustic apparatus housing has low internal loss and hence exhibits poor tone quality than that of a wooden housing. On the other hand, when an ABS resin is used instead of polypropylene (PP) in the material for acoustic apparatus housing, the resultant acoustic apparatus housing has a small internal loss and thus undergoes resonance, causing distortion, and therefore this material is not suitable for acoustic apparatus housing.

On the other hand, from the viewpoint of protecting the environment, conventionally, a resin derived from petroleum as noble fossil resources is frequently used as a material for acoustic apparatus housing, and it is expected that a substitute for the petroleum resin is rapidly developed for preventing the exhaustion of resources. Recently, a variety of synthetic resin materials are developed as materials for acoustic apparatus housing and provided, and the amount of the synthetic resin materials used in the field of acoustic apparatus housing increases year by year. Consequently, the amount of synthetic resin waste also increases, and the method for treatment of the resin waste leads to serious social problems. When the resins disposed of are directly subjected to thermal treatment, it is possible that harmful gas, such as dioxin, is generated or the incinerator suffers a damage due to large heat of combustion, leading to a danger of imposing a heavy burden on the environment.

As examples of conventionally known methods for treatment of waste resin, which are unlikely to impose a burden on the environment, there can be mentioned methods in which molecular weight of the waste resin is lowered by thermal decomposition or chemical decomposition and then incinerated or buried. However, the thermal disposal generates exhaust carbon dioxide and therefore possibly causes global warming, and, when a resin containing sulfur, nitrogen, or halogen is incinerated, exhaust harmful gas may be generated to cause air pollution. Currently, most of the resins used in the acoustic apparatus housing remain intact for a long term without decomposing after being disposed of and buried, and they may cause soil pollution or water pollution. For solving the problem, biodegradable resins have been developed recently and attracted attention, and put into practical use as disposal products, for example, mainly, utensils for daily use, sanitary goods, and play tools.

As mentioned above, it is known that the acoustic apparatus housing using wood has excellent tone quality. Therefore, as a non-natural material for acoustic apparatus housing, which is improved to have tone quality equivalent to or higher than that of the housing using wood, for example, a material obtained by mixing cellulose filler, such as wood meal or rice hull, with a resin is studied and used (Unexamined Japanese Patent Application Laid-Open Specification No. Hei 10-164679). In this case, the cellulose filler is surface-treated with phenol or the like for improving the compatibility with the resin. The cellulose filler, however, does not have satisfactory lubricating properties, as compared to general inorganic filler, and therefore only a limited amount of the cellulose filler can be added to the resin, making it difficult to improve the acoustic apparatus housing in rigidity.

In addition, when a loudspeaker is driven at a predetermined power, the acoustic apparatus housing using the cellulose filler vibrates itself in resonance with the loudspeaker vibration, so that the acoustic pressure frequency properties of the loudspeaker are not stabilized, causing deviation. This disadvantageously increases distortion in the acoustic apparatus housing. Further, the cellulose filler forms lignin or pyrolignous acid when being mixed with the resin and shaped. Therefore, the acoustic apparatus housing using the cellulose filler may suffer corrosion, and hence this material does not satisfy the requirements of the material for acoustic apparatus housing. Thus, there has been desired a material having excellent performance as an acoustic apparatus housing, which is unlikely to impose a burden on the environment and solves the above problems of corrosion and the like.

A task of the present invention is to provide a material which is advantageous not only in that it is unlikely to impose a burden on the environment and prevents the resin from suffering corrosion, but also in that it has excellent performance as an acoustic apparatus housing.

DISCLOSURE OF THE INVENTION

The present inventors have conducted extensive and intensive studies with a view toward achieving the above task. As a result, they have succeeded in creating a material for acoustic apparatus housing comprising a biodegradable polymer compound, an inorganic material, and a hydrolysis inhibitor, and further have found that the material for acoustic apparatus housing causes almost no adverse effect on the global environment and is excellent in output acoustic pressure level and distortion ratio as well as flatness and it can solve the problems of corrosion and the like, and found that all the above-mentioned conventional problems are solved and the material for acoustic apparatus housing is advantageously used as a raw material for the below-mentioned, specifically a variety of housing-related commercial products. The present inventors further have conducted studies and also found that the material for acoustic apparatus housing can be advantageously produced from a commercial point of view.

The present inventors have obtained the above various findings and then further conducted studies, and the present invention has been completed.

Specifically, the present invention is directed to:

(1) a material for acoustic apparatus housing, characterized in that it comprises a biodegradable polymer compound, an inorganic material, and a hydrolysis inhibitor;

(2) the material for acoustic apparatus housing according to item (1) above, characterized in that the biodegradable polymer compound is polysaccharide, biodegradable polyester, polyamino acid, polyvinyl alcohol, polyalkylene glycol, or a copolymer or mixture thereof; and (3) the material for acoustic apparatus housing according to item (2) above, characterized in that the biodegradable polyester is polylactic acid, polycaprolactone, polyhydroxybutyric acid, polyhydroxyvaleric acid, polyethylene succinate, polybutylene succinate, polybutylene adipate, polymalic acid, microbiologically synthetic polyester, or a copolymer or mixture thereof.

The present invention is directed to:

(4) the material for acoustic apparatus housing according to item (1) above, characterized in that the inorganic material comprises at least one member selected from aluminum hydroxide, magnesium hydroxide, calcium hydroxide, barium sulfonate, calcium carbonate, titanium oxide, alumina, mica, and talc;

(5) the material for acoustic apparatus housing according to item (2) above, characterized in that the inorganic material comprises at least one member selected from aluminum hydroxide, magnesium hydroxide, calcium hydroxide, barium sulfonate, calcium carbonate, titanium oxide, alumina, mica, and talc; and (6) the material for acoustic apparatus housing according to item (3) above, characterized in that the inorganic material comprises at least one member selected from aluminum hydroxide, magnesium hydroxide, calcium hydroxide, barium sulfonate, calcium carbonate, titanium oxide, alumina, mica, and talc.

The present invention is directed to:

(7) the material for acoustic apparatus housing according to item (1) above, characterized in that the hydrolysis inhibitor comprises at least one member selected from a carbodiimide compound, an isocyanate compound, and an oxazoline compound;

(8) the material for acoustic apparatus housing according to item (2) above, characterized in that the hydrolysis inhibitor comprises at least one member selected from a carbodiimide compound, an isocyanate compound, and an oxazoline compound;

(9) the material for acoustic apparatus housing according to item (3) above, characterized in that the hydrolysis inhibitor comprises at least one member selected from a carbodiimide compound, an isocyanate compound, and an oxazoline compound; and

(10) the material for acoustic apparatus housing according to item (4) above, characterized in that the hydrolysis inhibitor comprises at least one member selected from a carbodiimide compound, an isocyanate compound, and an oxazoline compound.

The present invention is directed to:

(11) the material for acoustic apparatus housing according to item (1) above, characterized in that it has a specific gravity of 1.3 $g/cm^3$ or more;

(12) the material for acoustic apparatus housing according to item (2) above, characterized in that it has a specific gravity of 1.3 $g/cm^3$ or more;

(13) the material for acoustic apparatus housing according to item (3) above, characterized in that it has a specific gravity of 1.3 $g/cm^3$ or more;

(14) the material for acoustic apparatus housing according to item (4) above, characterized in that it has a specific gravity of 1.3 $g/cm^3$ or more; and

(15) the material for acoustic apparatus housing according to item (7) above, characterized in that it has a specific gravity of 1.3 $g/cm^3$ or more.

The present invention is directed to:

(16) an acoustic apparatus housing characterized by being made of the material for acoustic apparatus housing according to item (1) above;

(17) an acoustic apparatus housing characterized by being made of the material for acoustic apparatus housing according to item (2) above;

(18) an acoustic apparatus housing characterized by being made of the material for acoustic apparatus housing according to item (3) above; and

(19) an acoustic apparatus housing characterized by being made of the material for acoustic apparatus housing according to item (7) above.

The present invention is directed to:

(20) an acoustic apparatus housing characterized by being made of the material for acoustic apparatus housing according to item (5) above;

(21) the material for acoustic apparatus housing according to item (1) above, characterized in that the acoustic apparatus is a television apparatus, a stereo apparatus, a radio cassette player, or a headphone; and

(22) a method for producing a material for acoustic apparatus housing, characterized by mixing a biodegradable polymer compound, an inorganic material, and a hydrolysis inhibitor.

BEST MODE FOR CARRYING OUT THE INVENTION

Figure 1:
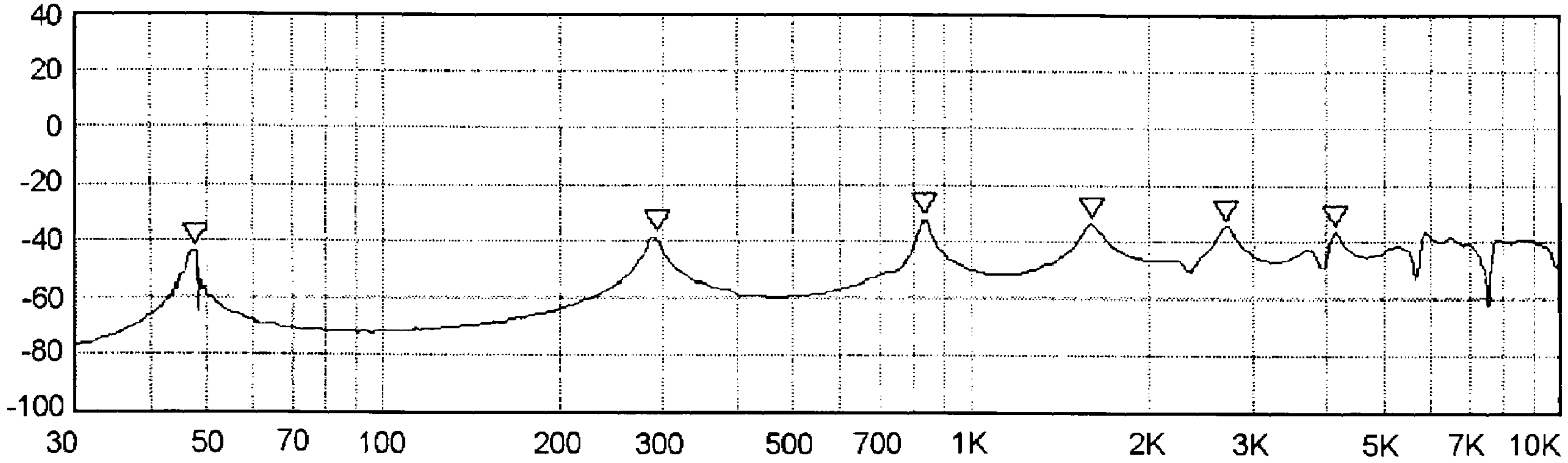
FIG. 1 shows the results of the damping test in Example 1.

The present invention is directed to a material for acoustic apparatus housing, characterized in that it comprises a biodegradable polymer compound, an inorganic material, and a hydrolysis inhibitor. In the present invention, it is preferred that the material for acoustic apparatus housing is a composite resin material comprised mainly of an inorganic material and a hydrolysis inhibitor. The material for acoustic apparatus housing may be in any form, for example, in the form of particles, pellets, or the like. With respect to the "acoustic apparatus housing", there is no particular limitation, and it may be a housing for known device called acoustic apparatus. Examples include housings for a television apparatus, a radio cassette player, a headphone, a loudspeaker, an audio component, or a microphone. In the present invention, it is preferred that the acoustic apparatus is comprised of a loudspeaker unit which generates an acoustic pressure, and an outer housing formed so that it surrounds the whole of the loudspeaker unit. Hereinbelow, the material for acoustic apparatus housing will be described with respect to the constituents, the production method, and the use.

The biodegradable polymer compound used in the present invention may be any polymer compound having biodegradability. It may be a known compound called biodegradable polymer compound or biodegradable resin. Examples include polysaccharide, biodegradable polyester, polyamino acid, polyvinyl alcohol, polyalkylene glycol, and copolymers and mixtures thereof. With respect to the biodegradability, there is no particular limitation, and it may be, for example, a property of being biochemically decomposed into carbon dioxide, water, and the like due to microorganisms, an enzyme, or the like.

The polysaccharide may be any saccharide which undergoes hydrolysis to form at least one monosaccharide, and it may be saccharide which undergoes hydrolysis to form monosaccharide and a derivative thereof simultaneously. There is no particular limitation, and examples include cellulose, cellulose ester (acetyl cellulose, cellulose propionate, cellulose butyrate, nitrocellulose, cellulose sulfonate, cellulose phosphate, and copolymers and mixtures thereof), cellulose ether (methyl cellulose, ethyl cellulose, carboxymethyl cellulose, carboxyethyl cellulose, hydroxyethyl cellulose, and hydroxypropyl cellulose), starch, chitosan, chitin chitosan, mannan, carrageenan, alginic acid, amylose, amylopectin, pectin, lentinan, hyaluronic acid, hylan, agarose, pullulan, dextran, and derivatives thereof (e.g., cellulose derivatives, such as cellulose propionate, cellulose acetate propionate, cellulose butyrate, cellulose acetate butyrate, hydroxyethyl cellulose, and hydroxypropyl cellulose), and copolymers and mixtures thereof. In the present invention, as the polysaccharide, a commercially available product, for example, SANWET (trade name; available from Sanyo Chemical Industries, Ltd.), Arasoap (trade name; available from Arakawa Chemical Industries, Ltd.), Sumikagel (trade name; available from Sumitomo Chemical Co., Ltd.), AQUA KEEP (trade name; available from SUMITOMO SEIKA CHEMICALS CO., LTD.), AQUA MATE (trade name; available from SEKISUI PLASTICS CO., LTD.), AQUA RESERVE AP (trade name; available from The Nippon Synthetic Chemical Industry Co., Ltd.), or AKUALICK CA (trade name; available from NIPPON SHOKUBAI CO., LTD.) can be used.

The biodegradable polyester may be any polymer compound having biodegradability and containing at least one ester linkage. Examples include aliphatic polyester, for example, polylactic acid, such as poly-L-lactic acid (PLLA) and copolymers of L-lactic acid and D-lactic acid (e.g., random copolymers and graft copolymers), derivatives thereof, and copolymers and mixtures thereof; and other polyester, such as polycaprolactone, polyhydroxybutyric acid, polyhydroxyvaleric acid, polyethylene succinate, polybutylene succinate, polybutylene adipate, polymalic acid, microbiologically synthetic polyester {e.g., 3-hydroxyburyrate (3HB), 3-hydroxyvalerate (3HV), and copolymers thereof}, derivatives thereof, and copolymers and mixtures thereof. In the present invention, as the biodegradable polyester, a commercially available product, for example, Celgreen P-H (trade name; available from Dicel Chemical Industries, Ltd.), Lacty (trade name; available from Shimadzu Corporation), or LACEA (trade name; available from Mitsui Chemicals, Inc.) can be used.

The polyamino acid may be any polymer compound having biodegradability and containing at least one peptide linkage. The polyamino acid can be produced by a known method. With respect to the method for producing the polyamino acid, there is no particular limitation, and examples include a method in which an N-carboxylic anhydride of an amino acid, such as glycine, alanine, valine, phenylalanine, glutamic ester, aspartic ester, leucine, or isoleucine, is polymerized in an organic solvent.

With respect to the polyvinyl alcohol, there is no particular limitation as long as it is a polymer compound having biodegradability and containing at least one vinyl bond having a hydroxyl group. The polyvinyl alcohol may be a commercially available product, and, as the commercially available product, polyvinyl alcohol is available from, for example, Showa Chemical Industry Co., Ltd.

The polyalkylene glycol may be any polymer compound having biodegradability and containing at least one divalent alkylene group substituted with a glycol group. The polyalkylene glycol may be a commercially available product, and examples of the commercially available products include Ucon™ (trade name) (available from Union Carbide Chemicals and Plastics Technology Corporation).

In the present invention, an organic polymer compound, which is biodegradable when it has a low molecular weight and poor in biodegradability when it has a high molecular weight, and which has biodegradability imparted by copolymerization (e.g., graft copolymerization) or the like, can be preferably used as the biodegradable polymer compound. Examples of the organic polymer compounds include polyethylene, polyacrylic acid derivatives, polypropylene, and polyurethane. With respect to the end group or molecular weight of the biodegradable polymer compound, there is no particular limitation, and, with respect to the mechanical strength or the like of the biodegradable polymer compound, there is no particular limitation as long as the resultant material can be used as a material for acoustic apparatus housing.

In the present invention, the biodegradable polymer compound is preferably biodegradable polyester, more preferably polylactic acid, most preferably LACEA™. LACEA™ is available from Mitsui Chemicals, Inc. at Chiyoda-ku, Tokyo. In the present invention, it is preferred that the biodegradable polymer compound is easily decomposed into lower molecular weight and changed to a compound unharmful to the environment after being disposed of in the natural environment, causing little adverse effect on the global environment, and it is more preferred that the compound can be shaped into an arbitrary form like existing thermoplastic resins, and it is most preferred that the compound is excellent in mixing properties and mass production properties.

With respect to the inorganic material used in the present invention, there is no particular limitation as long as the effect aimed at by the present invention is not sacrificed, and it may be a known material called inorganic material or classified into inorganic material. Examples include materials comprising at least one member selected from an inorganic hydroxide compound, such as aluminum hydroxide, magnesium hydroxide, or calcium hydroxide; an inorganic salt, such as barium sulfonate or calcium carbonate; an inorganic oxide compound, such as titanium oxide or alumina; and an inorganic silica compound, such as mica or talc. The inorganic materials are generally distributed widely as commercially available products, and examples of the commercially available products include aluminum hydroxide (trade name; available from Sumitomo Chemical Co., Ltd. at 27-1, Shinkawa 2-chome, Chuo-ku, Tokyo), KYOWASUIMAG F and KISUMA 1 (trade names; available from Kyowa Chemical Industry Co., Ltd.), and talc or mica (trade name; available from NIPPON TALC CO., LTD.). In the present invention, the inorganic materials may be used in combination.

With respect to the amount of the inorganic material added, there is no particular limitation, and the amount is appropriately determined depending on, for example, the type of the inorganic material, the type of the biodegradable polymer, or the mechanical strength of a desired material for acoustic apparatus housing. In the present invention, the amount of the inorganic material added is preferably in the range of about 1 to 99% by mass, more preferably in the range of about 5 to 70% by mass, based on the mass of the material for acoustic apparatus housing. In the present invention, from the viewpoint of protecting the environment, it is preferred that an inorganic hydroxide compound or/and an inorganic silica compound are used as the inorganic compound, and the amount of the inorganic hydroxide compound or/and inorganic silica compound added is preferably in the range of about 1 to 99% by mass, more preferably in the range of about 5 to 70% by mass, most preferably in the range of about 10 to 60% by mass, based on the mass of the material for acoustic apparatus housing.

The hydrolysis inhibitor used in the present invention is added for preventing the acoustic apparatus housing produced using the material of the present invention from easily decomposing due to, for example, moisture in air during the period of use of the acoustic apparatus to unable to function as a housing. The hydrolysis inhibitor may be any inhibitor which can inhibit the biodegradable polymer compound from undergoing hydrolysis, and it may be a known inhibitor called hydrolysis inhibitor. Examples include compounds having reactivity with a carboxylic acid group and a hydroxyl group as end functional groups of a resin, and more specific examples include carbodiimide compounds, isocyanate compounds, and oxazoline compounds. In the present invention, it is preferred that the hydrolysis inhibitor is a carbodiimide compound since it can be melt-kneaded with the biodegradable polymer compound and the carbodiimide compound added in a small amount can inhibit hydrolysis.

The carbodiimide compound may be any compound having at least one carbodiimide group in its molecule (including a polycarbodiimide compound). Examples of carbodiimide compounds include ones which can be synthesized by subjecting polymer isocyanate to decarboxylative polycondensation using an organophosphorus compound or an organometal compound as a catalyst in the absence of a solvent or in an inert solvent at a temperature of about 70° C. or higher, and more specific examples include monocarbodiimide compounds, such as dicyclohexylcarbodiimide, diisopropylcarbodiimide, dimethylcarbodiimide, diisobutylcarbodiimide, dioctylcarbodiimide, diphenylcarbodiimide, and naphthylcarbodiimide. In the present invention, it is preferred that the hydrolysis inhibitor is dicyclohexyl carbodiimide or diisopropyl carbodiimide which is easily commercially available. Examples of commercially available hydrolysis inhibitors include Carbodilite™ (trade name) available from Nisshinbo Industries, Inc., and N,N'-dicyclohexylcarbodiimide or N,N'-diisopropylcarbodiimide (trade name) available from Toyo Kasei Kogyo Co., Ltd.

The isocyanate compound may be any compound having at least one isonitrile group and at least one ester linkage. It may be a known compound called isocyanate compound. Examples include compounds comprising at least one member selected from an aromatic isocyanate compound, such as diphenylmethane diisocyanate or tolylene diisocyanate; alicyclic isocyanate, such as isophorone diisocyanate; and aliphatic isocyanate, such as hexamethylene diisocyanate.

The oxazoline compound may be any compound having a monovalent group derived from oxazole optionally substituted, and may be a known oxazoline compound or compound called oxazoline compound. Examples of "substituents" include halogen atoms (e.g., fluorine, chlorine, bromine, and iodine), a nitro group, a cyano group, a hydroxyl group, a thiol group, a sulfo group, a sulfino group, a mercapto group, a phosphono group, linear or branched alkyl groups (e.g., a methyl group, an ethyl group, an isopropyl group, a n-propyl group, a n-butyl group, an isobutyl group, a sec-butyl group, a tert-butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group), hydroxyalkyl groups (e.g., a hydroxymethyl group, a hydroxyethyl group, a 1-hydroxyisopropyl group, a 1-hydroxy-n-propyl group, a 2-hydroxy-n-butyl group, and a 1-hydroxyisobutyl group), halogenoalkyl groups (e.g., a chloromethyl group, a dichloromethyl group, a trichloromethyl group, a fluoromethyl group, a difluoromethyl group, a trifluoromethyl group, a 2-bromoethyl group, a 2,2,2-trifluoroethyl group, a pentafluoroethyl group, a 3,3,3-trifluoropropyl group, a 4,4,4-trifluorobutyl group, a 5,5,5-trifluoropentyl group, and a 6,6,6-trifluorohexyl group), cycloalkyl groups (e.g., a cyclopropyl group, a cyclobutyl group, a cyclopentyl group, a cyclohexyl group, and a cycloheptyl group), alkenyl groups (e.g., a vinyl group, a crotyl group, a 2-pentenyl group, and a 3-hexenyl group), cycloalkenyl groups (e.g., a 2-cyclopentenyl group, a 2-cyclohexenyl group, a 2-cyclopentenylmethyl group, and a 2-cyclohexenylmethyl group), alkynyl groups (e.g., an ethynyl group, a 1-propynyl group, a 2-propynyl group, a 1-butynyl group, a 2-pentynyl group, and a 3-hexynyl group), an oxo group, a thioxo group, an amidino group, an imino group, alkylenedioxy groups (e.g., a methylenedioxy group and an ethylenedioxy group), hydrocarbon groups, e.g., monocyclic or condensed cyclic hydrocarbon groups, such as a phenyl group and a biphenyl group, and bridged cyclic hydrocarbon groups, such as a 1-adamantyl group and a 2-norbornanyl group, alkoxy groups (e.g., a methoxy group, an ethoxy group, a propoxy group, an isopropoxy group, a butoxy group, an isobutoxy group, a sec-butoxy group, a tert-butoxy group, a pentyloxy group, a neopentyloxy group, and a hexyloxy group), alkylthio groups (e.g., a methylthio group, an ethylthio group, a propylthio group, an isopropylthio group, a butylthio group, an isobutylthio group, a pentylthio group, and a hexylthio group), a carboxyl group, alkanoyl groups (e.g., a formyl group; an acetyl group, a propionyl group, a butyryl group, and an isobutyryl), alkanoyloxy groups (e.g., a formyloxy group; and alkylcarbonyloxy groups, such as an acetyloxy group, a propionyloxy group, a butyryloxy group, and an isobutyryloxy group), alkoxycarbonyl groups (e.g., a methoxycarbonyl group, an ethoxycarbonyl group, a propoxycarbonyl group, and a butoxycarbonyl group), aralkyloxycarbonyl groups (e.g., a benzyloxycarbonyl group) a thiocarbamoyl group, alkylsulfinyl groups (e.g., a methylsulfinyl group and an ethylsulfinyl group), alkylsulfonyl groups (e.g., a methylsulfonyl group, an ethylsulfonyl group, and a butylsulfonyl), a sulfamoyl group, monoalkyl sulfamoyl groups (e.g., a methylsulfamoyl group and an ethylsulfamoyl group), dialkylsulfamoyl groups (e.g., a dimethylsulfamoyl group and a diethylsulfamoyl group), arylsulfamoyl groups (e.g., a phenylsulfamoyl group and a naphthyl sulfamoyl group), aryl groups (e.g., a phenyl group and a naphthyl group), aryloxy groups (e.g., a phenyloxy group and a naphthyloxy group), arylthio groups (e.g., a phenylthio group and a naphthylthio group), arylsulfinyl groups (e.g., a phenylsulfinyl group and a naphthylsulfinyl group), arylsulfonyl groups (e.g., a phenylsulfonyl group and a naphthylsulfonyl group), arylcarbonyl groups (e.g., a benzoyl group and a naphthoyl group), arylcarbonyloxy groups (e.g., a benzoyloxy group and a naphthoyloxy group), alkylcarbonylamino groups optionally halogenated (e.g., an acetylamino group and a trifluoroacetylamino group), carbamoyl groups optionally having a substituent {e.g., groups represented by the formula: —$CONR^3R^4$ (wherein each of $R^3$ and $R^4$ represents a hydrogen atom, a hydrocarbon group optionally having a substituent, or a heterocyclic group optionally having a substituent, and $R^3$ and $R^4$ and the adjacent nitrogen atom optionally together form a ring)}, amino groups optionally having a substituent (e.g., an amino group, an alkylamino group, a tetrahydropyrrolyl group, a piperazyl group, a piperidyl group, a morpholino group, a thiomorpholino group, a pyrrolyl group, and an imidazolyl group), ureide groups optionally having a substituent {e.g., groups represented by the formula: —$NHCONR^3R^4$ (wherein $R^3$ and $R^4$ are as defined above)}, carboxamide groups optionally having a substituent {e.g., groups represented by the formula: —$NR^3COR^4$ (wherein $R^3$ and $R^4$ are as defined above)}, sulfonamide groups optionally having a substituent {e.g., groups represented by the formula: —$NR^3SO_2R^4$ (wherein $R^3$ and $R^4$ are as defined above)}, a hydroxyl group or a mercapto group optionally having a substituent, heterocyclic groups optionally having a substituent {such as aromatic heterocyclic groups (e.g., a pyridyl group, a furyl group, and a thiazolyl group) containing, as atoms constituting a ring system (ring forming atoms), a carbon atom and at least one member selected from 1 to 3 types of hetero atoms of an oxygen atom, a sulfur atom, and a nitrogen atom, and saturated or unsaturated aliphatic heterocyclic groups}, and substituents obtained by chemically acceptably substituting the above substituents.

With respect to the amount of the hydrolysis inhibitor added, there is no particular limitation. In the present invention, the amount of the hydrolysis inhibitor added is preferably adjusted depending on the rate of biodegradation, more preferably about 5% by mass or less, based on the mass of the biodegradable polymer compound, most preferably appropriately determined depending on the mechanical strength of the desired acoustic apparatus housing, the type of the biodegradable polymer compound, the type of the inorganic material, or the like.

In the present invention, for surely obtaining mechanical strength required for the material for acoustic apparatus housing, it is preferred that a rubber component is further added to the material for acoustic apparatus housing. With respect to the rubber component, there is no particular limitation, and it may be either a natural rubber or a synthetic rubber. Examples include styrene elastomers, olefin elastomers, urethane elastomers, polyester elastomers, and polyamide elastomers.

Example of the styrene elastomers include SB (polystyrene-polybutadiene), SEBS {polystyrene-poly(ethylene-butylene)-polybutadiene}, SIS (polystyrene-polyisoprene-polystyrene), SEPS {polystyrene-poly-(ethylene-propylene)-polystyrene}, and SBS (polystyrene-polybutadiene-polystyrene) block copolymers. As the styrene elastomer, a commercially available product can be used, and examples of the commercially available products include KRATON, CARIFLEX TR, and KRATON G (tradenames) available from shell Chemicals; SOLPRENE (trade name) available from Philips Petrolefam; EUROPRENE SOLT (trade name) available from ANIC; Tufprene (trade name) available from Asahi Kasei Corporation; SOLPRENE T (tradename) available from Nippon Elastomer Co. Ltd.; JSRTR (trade name) available from JSR Corporation; DENKA STR (trade name) available from Denka Kagaku Kogyo Kabushiki Kaisha; and Quintac (trade name) available from ZEON CORPORATION.

As examples of the olefin elastomers, there can be mentioned ethylene-α-olefin random copolymers and those having diene copolymerized as the third component, and specific examples include ethylene-propylene random copolymers, ethylene-1-butene random copolymers, and copolymers comprising EPDM (ethylene-propylene-diene copolymers having dicyclopentadiene or ethylidene norbornene as a diene component) as a soft segment and polyolefin as a hard segment. Examples of commercially available products include TAFMER and MILASTOMER (trade names) available from Mitsui Chemicals, Inc.

Examples of the urethane elastomers include polyurethane comprising polyester, low-molecular weight glycol, and methylenebis(phenyl isocyanate) or tolidine diisocyanate, which is obtained by addition polymerization of polyisocyanate with polylactone ester polyol in the presence of short-chain polyol (polyether polyurethane); polyurethane which is obtained by addition polymerization of polyisocyanate with adipate polyol obtained from adipic acid and glycol in the presence of short-chain polyol (polyester polyurethane); and polyurethane which is obtained by addition polymerization of polyisocyanate with polytetramethylene glycol obtained by ring opening of tetrahydrofuran in the presence of short-chain polyol. Examples of commercially available products include Vulkollan (trade name) available from Bayer Ltd.; Chemigum SL (trade name) available from Goodyear; Adiprene (trade name) available from Du Pont Co.; and Vulcaprene (trade name) available from ICI.

Examples of the polyester elastomers include copolymers comprising aromatic polyester as a hard segment and non-crystalline polyether or aliphatic polyester as a soft segment. More specific examples include polybutylene terephthalate/polytetramethylene ether glycol block copolymers.

Examples of the polyamide elastomers include copolymers comprising Nylon™ as a hard segment and polyester or polyol as a soft segment. More specific examples include Nylon™ 12/polytetramethylene glycol block copolymers.

In the present invention, from the viewpoint of protecting the environment, it is preferred that the rubber component is a natural rubber or a biodegradable elastomer disclosed in Unexamined Japanese Patent Application Laid-Open Specification No. 2001-240655.

In the present invention, the material for acoustic apparatus housing can be produced by mixing the biodegradable polymer compound, the inorganic material, and the hydrolysis inhibitor with one another.

With respect to the mixing, there is no particular limitation, and it may be a known agitation or kneading means. Examples include a container revolution mixing or kneading method in which a container itself is rotated or/and vibrated, a mechanical-agitation or -kneading mixing method in which agitation is made by means of a blade or the like, a fluid-agitation mixing method in which agitation is made by means of air or gas, and a non-agitation mixing method using gravity flow, branch plates, or connection sleeves. With respect to the state of the components mixed, there is no particular limitation, and the components may be uniformly mixed, non-uniformly mixed, or mixed by heating. With respect to the conditions for mixing including the composition and the order of mixing the components, there is no particular limitation. In the present invention, it is preferred that a melt-kneading method is used as the mixing means. More specifically, it is preferred that the hydrolysis inhibitor, e.g., a carbodiimide compound is added by a melt-kneading method.

The melt-kneading method may be any method as long as the biodegradable polymer compound, the inorganic material, and the hydrolysis inhibitor can be mixed with one another while heating. As the mixing means, the mixing method mentioned above may be used, and, as the heating means, a known means, such as an oven or a heater, may be used. With respect to the temperature for the heating, there is no particular limitation. In the present invention, when poly-L-lactic acid (PLLA) is used as the biodegradable polymer compound, the temperature for the heating is preferably about 100 to 250° C., more preferably about 150 to 200° C., most preferably about 170 to 180° C. In the present invention, it is preferred that the heat-kneading method is employed and then the mixture obtained by the heat-kneading method is cooled. With respect to the cooling means, there is no particular limitation, and it may be a known means, such as a means for cooling using ice water, water, dry ice, or liquid nitrogen, or a naturally cooling means. In the present invention, it is preferred that the cooling means is naturally cooling.

In the material for acoustic apparatus housing, if desired, various known additives may be further incorporated as long as the acoustic properties are not markedly sacrificed. Examples of additives include an antioxidant, a light stabilizer, an ultraviolet light absorber, a pigment, a colorant, an antistatic agent, a release agent, a perfume, a lubricant, a flame retardant, filler, and an anti-fungus agent.

The material for acoustic apparatus housing produced by the above-mentioned method is preferably used as a material for acoustic apparatus. In the present invention, it is preferred that the material for acoustic apparatus housing is used as a material for, for example, an acoustic apparatus available from Sony Corporation at 7-35, Kitashinagawa 6-chome, Shinagawa-ku, Tokyo, such as a loudspeaker, WALKMAN™, a television apparatus, a radio cassette player, a headphone, an audio component, or a microphone. In the present invention, from the viewpoint of obtaining excellent tone quality, it is preferred that the material for acoustic apparatus housing has a higher specific gravity, more specifically, preferably a specific gravity of about 1.3 g/cc or more, more preferably about 1.35 g/cc or more, most preferably about 1.40 g/cc or more.

Hereinbelow, the present invention will be described in more detail with reference to the following Examples, which should not be construed as limiting the scope of the present invention.

EXAMPLE 1

Preparation of Sample

Employing the composition in Example 1 shown in Table 1, as a resin (A) which is a biodegradable polymer, LACEA™ (H100J; Mitsui Chemicals, Inc.) belonging to polylactic acid was used, as an inorganic material (B), an $Al(OH)_3$ reagent was used as it was, and, as a hydrolysis inhibitor (C), a Carbodilite 8CA reagent was used as it was. The components A, B, and C were mixed using a melt-kneading method. Conditions for the mixing are such that the kneader is Mini-max-mixtruder (manufactured and sold by Toyo Seiki Sei-saku-Sho, Ltd.), the nozzle temperature is 170° C., the torque is 5 kg, and the residence time is 3 seconds. After the melt-kneading, the mixture was naturally cooled, and the resultant resin composite was pulverized, and shaped by pressing under 300 kg/cm$^2$ at 170° C. into a board material having a thickness of 1.0 mm. Then, the shaped material was cut out into a 10.0 mm×100 mm specimen, and the resultant specimen was used as a sample in Example 1 having the composition shown in Table 1.

EXAMPLES 2 to 4

Samples in Examples 2 to 4 were individually prepared in substantially the same manner as in Example 1 except that the compositions in Examples 2 to 4 shown in Table 1 were employed.

COMPARATIVE EXAMPLE 1

A shaped board material was obtained in substantially the same manner as in Example 1 except that a material having the composition in Comparative Example 1 shown in Table 1, obtained by adding an inorganic material (barium sulfonate) to ABS which is a resin derived from petroleum, and which has no biodegradability, and adding no hydrolysis inhibitor, was used, and then the shaped material was cut out into the same size to prepare a sample in Comparative Example 1.

COMPARATIVE EXAMPLE 2

A shaped board material was obtained in substantially the same manner as in Example 1 except that polylactic acid containing no inorganic material was used employing the composition in Comparative Example 2 shown in Table 1, and then the shaped material was cut out into the same size to prepare a sample in Comparative Example 2.

TABLE 1

(Specific compositions in Examples and Comparative Examples)

| Sample | Resin (A) | Inorganic material (B) | Hydrolysis inhibitor (C) |
|---|---|---|---|
| Example 1 | Polylactic acid 53.25 | $Al(OH)_3$ 45 | 8CA 1.75 |
| Example 2 | Polylactic acid 47.5 | $Al(OH)_3$ 50 | 8CA 2.5 |
| Example 3 | Polylactic acid 61.75 | $Al(OH)_3$ 35 | 8CA 3.25 |
| Example 4 | Polylactic acid 38.75 | $Al(OH)_3$ 60 | 8CA 1.25 |
| Comparative Example 1 | ABS 75 | $BaSO_4$ 25 | |
| Comparative Example 2 | Polylactic acid 99 | | 8CA 1 |

Unit: Part(s) by mass (Measurement of Specific Gravity)

With respect to each the samples (also called specimens) in Examples 1 to 4 and Comparative Examples 1 and 2, a weight was precisely measured, and the weight measured was divided by a volume of the specimen (determined by measuring a length, a width, and a height of the specimen and multiplying them) to determine a specific gravity. The results are shown in Table 2.

TABLE 2

(Specific gravity)

| Sample | Specific gravity (g/cc) |
|---|---|
| Example 1 | 1.635 |
| Example 2 | 1.619 |

TABLE 2-continued (Specific gravity)

| Sample | Specific gravity (g/cc) |
| --- | --- |
| Example 3 | 1.452 |
| Example 4 | 1.764 |
| Comparative Example 1 | 1.581 |
| Comparative Example 2 | 1.232 |

(Damping Test)

With respect to each of the samples in Examples 1 to 4 and Comparative Examples 1 and 2, the damping properties were evaluated in respect of the material for acoustic apparatus housing as follows.

The samples in Examples 1 to 4 were individually tested using a vibration lead method at a measurement temperature of 20° C. In the vibration lead method, each sample is cantilevered at one end as viewed in the longitudinal direction of the sample, and the cantilevered sample is subjected to non-contact vibration by means of an electromagnet, and a capacitor measures a very small displacement of the sample caused by the vibration to determine a resonant frequency. From the function of the frequency, a dynamic elastic modulus is determined, and an internal loss is determined from the resonance state. A similar measurement was conducted with respect to each of the samples in Comparative Examples 1 and 2. The vibration lead method was conducted in accordance with the method described in Sound and Vibration Damping with Polymers (written by Robert D. Corsaro, published by The American Chemical Society).

(Results of Damping Test)

Figure 2:
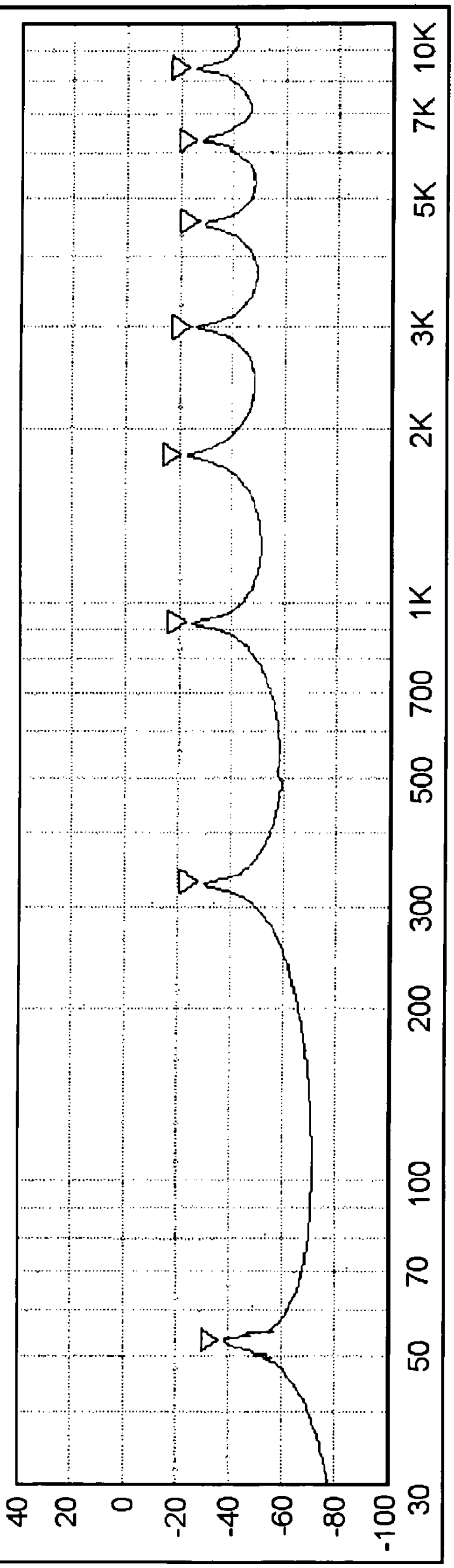
FIG. 2 shows the results of the damping test in Example 2.
Figure 3:
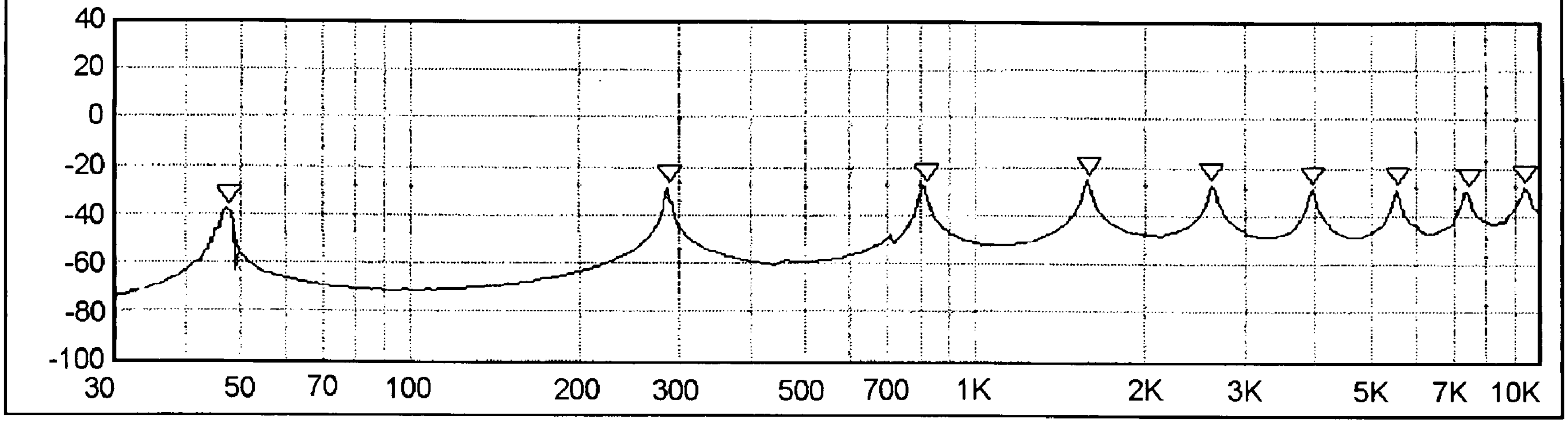
FIG. 3 shows the results of the damping test in Example 3.
Figure 4:
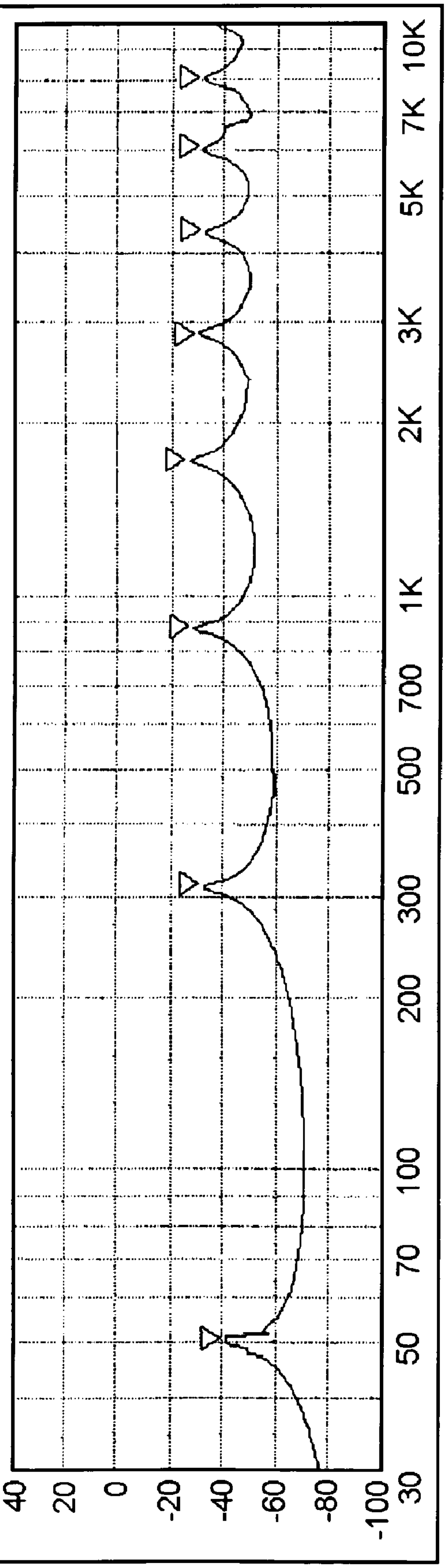
FIG. 4 shows the results of the damping test in Example 4.
Figure 5:
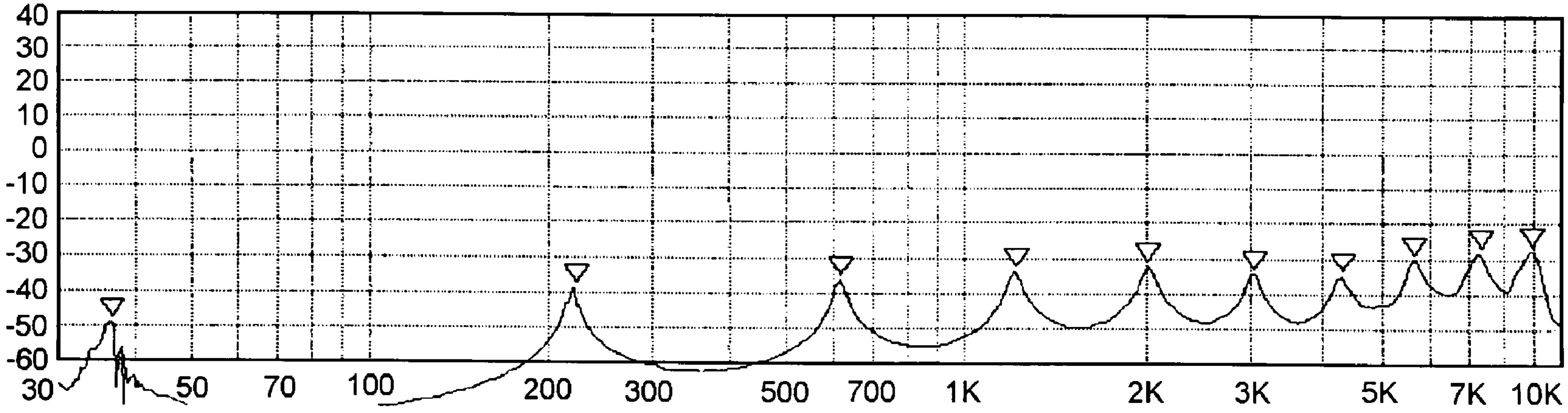
FIG. 5 shows the results of the damping test in Comparative Example 1.
Figure 6:
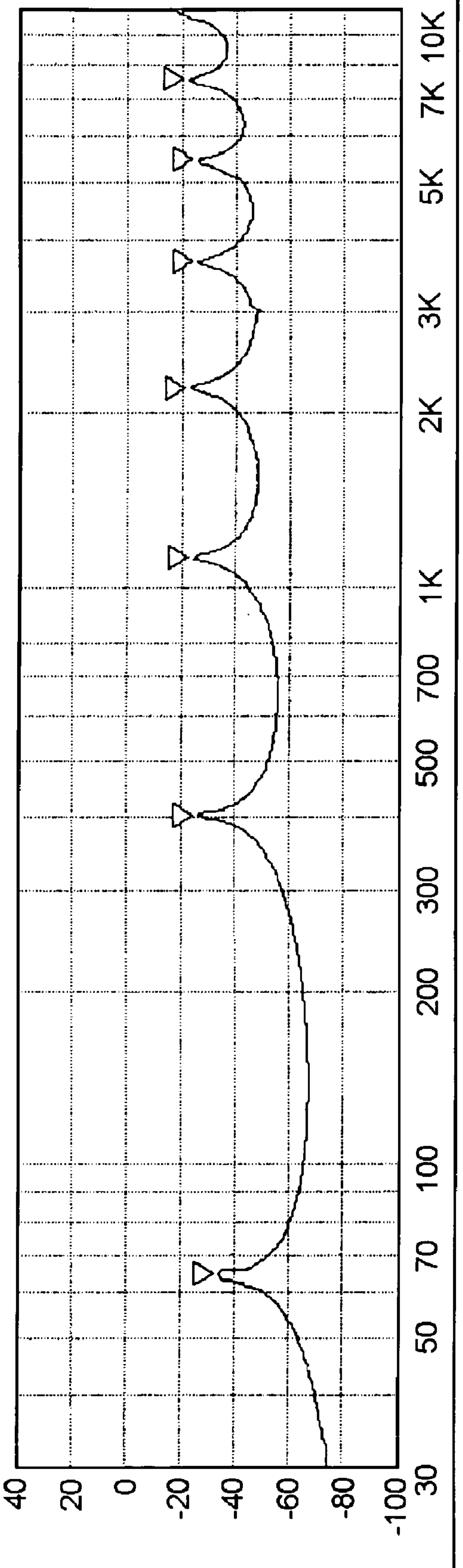
FIG. 6 shows the results of the damping test in Comparative Example 2.

The results of the damping test are shown in FIGS. 1 to 6. In the figures, F0 designates a resonant frequency, and F1 and F2 designate a frequency corresponding to a 3 dB down ($1/\sqrt{2}$) value of the vibrational velocity of the resonant frequency, indicated by a unit of Hz. Q designates a value $2\pi$ times the ratio of the vibrational energy to the energy per one cycle given from the outside for maintaining the vibration, representing the damping properties. 1/Q designates a damping degree. E designates a dynamic elastic modulus (Pa), and VELOCITY designates a velocity (m/s). In the graphs, a vibration displacement is taken as the ordinate, and a frequency is taken as the abscissa.

As apparent from the results of the damping test, the material for acoustic apparatus housing of the present invention is excellent in frequency properties and improved in output acoustic pressure level and distortion ratio as well as flatness, as compared to a conventional material for acoustic apparatus housing.

By the present invention, there can be provided a material which is advantageous not only in that it is very unlikely to impose a burden on the environment after being disposed of, differing from the material for acoustic apparatus housing comprised of an existing thermoplastic resin, but also in that the material is prevented by the hydrolysis inhibitor from rapidly decomposing and hence excellent in both the performance as a material for acoustic apparatus housing and the protection of environment.

The invention claimed is:

1. An audio equipment housing made of a material comprising:

a biodegradable polymer compound;

an inorganic material;

a rubber component in an amount sufficient to provide appropriate mechanical strength to the material; and a hydrolysis inhibitor, wherein, the material has (a) a specific gravity of 1.3 g/cm$^3$ or more, (b) a velocity of 1700 m/s or more, and (c) a dynamic elastic modulus (E(Pa)) of 4.0E +09 or more.

2. The audio equipment housing according to claim 1, wherein the biodegradable polymer compound is selected from the group consisting of polysaccharide, biodegradable polyester, polyamino acid, polyvinyl alcohol, polyalkylene glycol, a copolymer thereof, and a mixture thereof.

3. The audio equipment housing according to claim 2, wherein, the biodegradable polyester is selected from the group consisting of polylactic acid, polycaprolactone, polyhydroxybutyric acid, polyhydroxyvaleric acid, polyethylene succinate, polybutylene. succinate, polybutylene adipate, polymalic acid, microbiologically synthetic polyester, a copolymer thereof, and a mixture thereof.

4. The audio equipment housing according to claim 1, wherein, the inorganic material comprises at least one member selected from aluminum hydroxide, magnesium hydroxide, calcium hydroxide, barium sulfonate, calcium carbonate, titanium oxide, alumina, mica, and talc.

5. The audio equipment housing according to claim 2, wherein, the inorganic material comprises at least one member selected from aluminum hydroxide, magnesium hydroxide, calcium hydroxide, barium sulfonate, calcium carbonate, titanium oxide, alumina, mica, and talc.

6. The audio equipment housing according to claim 3, wherein, the inorganic material comprises at least one member selected from aluminum hydroxide, magnesium hydroxide, calcium hydroxide, barium sulfonate, calcium carbonate, titanium oxide, alumina, mica,and talc.

7. The audio equipment housing according to claim 1, wherein, the hydrolysis inhibitor comprises at least one member selected from a carbodiimide compound, an isocyanate compound, and an oxazoline compound.

8. The audio equipment housing according to claim 2, wherein, the hydrolysis inhibitor comprises at least one member selected from a carbodiimide compound, an isocyanate compound, and an oxazoline compound.

9. The audio equipment housing according to claim 3, wherein the hydrolysis inhibitor comprises at least one member selected from a carbodiimide compound, an isocyanate compound, and an oxazoline compound.

10. The audio equipment housing according to claim 4, wherein, the hydrolysis inhibitor comprises at least one member selected from a carbodiimide compound, an isocyanate compound, and an oxazoline compound.

11. The audio equipment housing according to claim 1, wherein, the audio equipment housing is a television apparatus, a stereo apparatus, a radio cassette player, or a headphone.

* * * * *